United States Patent [19]

Kodama et al.

[11] 4,025,485

[45] May 24, 1977

[54] ORGANOPOLYSILOXANE COMPOSITIONS

[75] Inventors: Iehiro Kodama; Yoshiaki Kudo; Takahide Kobori; Tokue Kozima, all of Annaka, Japan

[73] Assignee: Shin-Etsu Chemical Company Limited, Tokyo, Japan

[22] Filed: July 20, 1976

[21] Appl. No.: 707,077

[30] Foreign Application Priority Data

July 24, 1975 Japan .............................. 50-90635

[52] U.S. Cl. .................... 260/37 SB; 260/46.5 UA
[51] Int. Cl.$^2$ ........................................ C08L 83/04
[58] Field of Search ................ 260/37 SB, 46.5 UA

[56] References Cited

UNITED STATES PATENTS

| | | | |
|---|---|---|---|
| 3,692,732 | 9/1972 | Degen et al. | 260/37 SB |
| 3,821,140 | 6/1974 | Milbert | 260/37 SB |

*Primary Examiner*—Lewis T. Jacobs
*Attorney, Agent, or Firm*—Toren, McGeady and Stanger

[57] ABSTRACT

The organopolysiloxane compositions comprising a dimethylpolysiloxane, an organohydrogenpolysiloxane, a silica filler, zinc carbonate, ceric oxide, and a platinum compound. They are useful for producing electrically insulating materials and fire-resistant materials with excellent heat stability and flame retardancy.

14 Claims, No Drawings

ORGANOPOLYSILOXANE COMPOSITIONS

BACKGROUND OF THE INVENTION

This invention relates to organopolysiloxane compositions. More particularly, the invention relates to organopolysiloxane compositions useful for the making of electrically insulating or fire resisting materials which have excellent heat stability and flame retardancy.

Known organopolysiloxane compositions that can be used for the production of electrically insulating materials are disadvantaged by an insufficient flame retardancy, despite excellent heat stability and flexibility. On the other hand, organopolysiloxane compositions proposed to have an improved flame retardancy are found to be unsatisfactory for the applications where a very high degree of flame retardancy is required. (See, for example, U.S. Pat. Nos. 3,514,424, 3,539,530 and 3,711,520.) That is to say, no prior art organopolysiloxane compositions are suitable for the manufacture of electrically insulating materials of high performance with respect of flame retardancy as well as heat stability and flexibility.

SUMMARY OF THE INVENTION

It is therefore a primary object of the present invention to provide organopolysiloxane compositions which, having excellent heat stability, flexibility and flame retardancy, are suitable for the manufacture of electrically insulating and fire resisting materials.

The organopolysiloxane composition in accordance with the present invention comprises A. 100 parts by weight of a mixture consisting of (a) an organopolysiloxane having at least two vinyl groups directly bonded to the silicon atoms in a molecule and (b) an organohydrogenpolysiloxane having at least three hydrogen atoms directly bonded to the silicon atoms, the amount of the organohydrogenpolysiloxane being sufficient to provide at least one and half hydrogen atomms directly bonded to the silicon atoms per vinyl group of component (a), B. from 5 to 50 parts by weight of a silica filler,
C. from 0.5 to 40 parts by weight of zinc carbonate,
D. from 0.05 to 10 parts by weight of ceric oxide, and
E. a catalytic amount of platinum or a platinum compound.

DETAILED DESCRIPTION OF THE INVENTION

The organopolysiloxane as component (a) useful in the compositions of the present invention is required to contain at least two vinyl groups bonded directly to the silicon atoms in a molecule, and represented, for example, by the following general formula

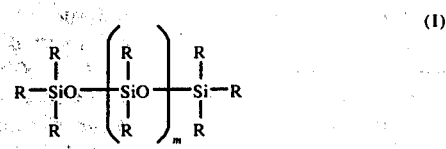

(I)

where each R, which may be the same of different, is a substituted or unsubstituted, saturated or unsaturated monovalent hydrocarbon group, such as methyl, ethyl, propyl, phenyl, vinyl or trifluoropropyl group, with the proviso that at least two of the R are vinyl groups, and m is a positive integer.

It is desired that the organopolysiloxane as component (a) has a viscosity in the range of from 200 to 100,000 centistokes, or preferably to 20,000 centistokes, as measured at 25° C. Any viscosities exceeding this range would give a poor working efficiency to the resulting compositions especially for production of electrically insulating materials in the step of coating or impregnating glass fibers or the like.

The above-mentioned viscosity range may be attained by blending two or more organopolysiloxanes having viscosities beyond that range, say, higher than 100,000 centistokes and lower than 200 centistokes.

When electrically insulating materials formed by coating or impregnating glass fiber articles, such as glass cloths, glass mats and glass sleeves, with the composition of the present invention, are desired to have improved mechanical strengths and flexibility, it is preferred to use organopolysiloxanes whose molecular chain ends are blocked with dimethylvinylsilyl groups.

It is optional that the organopolysiloxane as component (a) is a blend of the linear diorganopolysiloxane expressed by formula (I) and an organopolysiloxane with the resin structure composed of the organosiloxane units represented by the formulas $R_3SiO_{0.5}$, $R_2SiO$ and $SiO_2$, where each R has the same meaning as defined for formula (I). It is recommendable, however, that the blend of the linear diorganopolysiloxane and the resin-type organopolysiloxane is in a ratio such that more than 80% by weight is the former, in order to impart a sufficient degree of flexibility to the cured composition.

The organohydrogenpolysiloxane as component (b) reacts with component (a) to crosslink and increase the molecular weight of component (a), and further serves to make the resulting compositions sufficiently adhesive to glass fiber articles and electrically insulating materials sufficiently flame retardant. The organohydrogenpolysiloxanes as component (b) are required to contain at least three hydrogen atoms bonded directly to the silicon atoms in a molecule, and include those represented by the following general formula

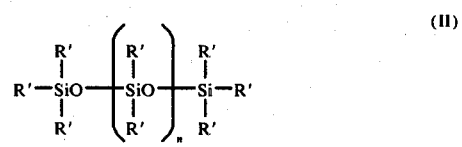

(II)

where each R', which may be the same or different, is a hydrogen atom or a substituted or unsubstituted monovalent hydrocarbon group, such as methyl or phenyl group, with the proviso that at least three of the R' are hydrogen atoms, and n is a positive integer; copolymers of $R'_2HSiO_{0.5}$ and $R'SiO_{1.5}$ units; copolymers of $R'_2HSiO_{0.5}$, $R'_2SiO$ and $R'SiO_{1.5}$ units, copolymers of R'HSiO, $R'_2SiO$ and $R'SiO_{1.5}$; and copolymers of $R'_2HSiO_{0.5}$, $SiO_2$ and $R'_3SiO_{0.5}$ units, where each R' has the same meaning as defined for formula (II) except that a hydrogen atom is excluded.

In accordance with the present invention, it is necessary to use component (b) in an amount sufficient to provide at least 1.5 or, preferably, from 1.5 to 30 hydrogen atoms directly bonded to the silicon atoms per vinyl group of component (a), in order to impart a sufficient flame retardancy to the resulting composition.

The principle of crosslinking organopolysiloxanes is known in the prior art to be the mechanism of addition reaction between silicon-bonded vinyl groups and silicon-bonded hydrogen atoms. It is a generally accepted practice, however, that the formulation of the organopolysiloxane compositions is such that the silicon-bonded vinyl groups are present in the composition in an amount equal to or larger than the equimolar amount of the silicon-bonded hydrogen atoms, because heat stability and mechanical strengths become lowered by any excessive amount of the silicon-bonded hydrogen atoms remaining in the composition after crosslink formation. It is a surprising discovery that excellent flame retardancy can be obtained without the sacrifice of heat stability and mechanical strengths by the presence of the excessive amount of the silicon-bonded hydrogen atoms together with the synergistic effect of the other components in the compositions of the present invention.

The silica fillers as component (B) useful in the compositions of the invention serves to impart improved mechanical strengths and heat stability to products prepared from the composition. Their typical examples are fumed silica, diatomaceous earth and precipitated silica. It is desired that the silica fillers have an average particle diameter smaller than 10 $\mu$m or, preferably, smaller than 1 $\mu$m. Use of fumed silica having a specific surface area of 100 to 400 m$^2$/g and an average particle diameter of 10 to 50 nm is particularly preferred.

It is required to use the silica filler to form the objective composition in an amount of from 5 to 50 parts by weight per 100 parts by weight of mixture (A) of components (a) and (b). If the amount is smaller than this range, no satisfactory results can be obtained. On the other hand, if it is too large, the flowability of the resulting composition is decreased.

The flowability of the composition and the heat stability of the cured composition may further be improved by use of a silica filler which has been treated with an organochlorosilane, e.g., trimethylchlorosilane, so as to decrease the content of hydroxy groups on the surface of the silica.

The zinc carbonate as component (C) usually in the form of powder serves to impart good heat stability, flexibility, mechanical strengths and flame retardancy to products to be produced by impregnating or coating glass fiber articles or the like with the resulting composition. The zinc carbonate useful in accordance with the present invention includes basic zinc carbonate 2ZnCO$_3$·3Zn(OH)$_2$. A small amount of crystallization water may be present in the zinc carbonate. In general, the powdery zinc carbonate has an average particle diameter not exceeding 10 $\mu$m or, preferably, not exceeding 5 $\mu$m.

In accordance with the present invention, the amount of component (C) is limited to 0.5 to 40 parts by weight per 100 parts by weight of mixture A of components (a) and (b). If the amount is smaller than 0.5 part by weight, no sufficient flame retardancy of the resulting composition can be obtained, while, on the other hand, if it exceeds 40 parts by weight, the flowability of the resulting composition is decreased.

The ceric oxide as component (D) usually in the form of powder incorporated in the composition of the present invention serves to impart a further improved heat stability to electrically insulating material to be produced by coating or impregnating glass fiber articles with the composition, without impairing the flame retardant property of the material. The amount of the powdery ceric oxide to be used in accordance with the present invention ranges from 0.05 to 10 parts by weight per 100 parts by weight of mixture (A) of components (a) and (b). If the amount is smaller than 0.05 part by weight, no satisfactory heat stability can be attained, while if it is larger than 10 parts by weight, no particular effect can be obtained.

The platinum or platinum compound as component (E) is an indispensable component for promoting crosslinking by the addition reaction between components (a) and (b). As such component (E) there can be mentioned, for example, finely dispersed metallic platinum, chloro-platinic acid, platinum-olefin complexes and coordination compounds of platinum with alcohols. In general, component (E) is used in a catalytic amount, say, 1 to 50 ppm based on the total weight of mixture A of components (a) and (b).

The composition of the present invention can easily be obtained merely by mixing the foregoing components (a) to (f), and is readily cured by heating at 100° to 200° C for 1 to 60 minutes, to give a cured composition with rubber-like elasticity and excellent mechanical strengths including tensile strength and elongation.

The compositions of the present invention have a wide variety of uses. When used, for example, for manufacture of electrically insulating materials, the compositions per se or dissolved in a solvent are applied to coat or impregnate glass fiber articles, such as glass cloths, glass mats, glass sleeves, glass tapes and glass rovings. The resulting electrically insulating materials have excellent stability, flexibility and flame retardancy. The compositions of the present invention are, for a further example, used for manufacture of fireproof curtains serving as a fire barrier by coating or impregnating fabric materials, such as asbestos cloths.

The present invention will now be further illustrated by the following examples. In the examples, parts are all parts by weight. Hardness, tensile strength and elongation as referred to in the examples were determined in accordance with Japanese Industrial Standard K 6301. Further in the examples flame retardancy is what was determined by the following procedure.

A glass cloth was coated with a sample composition and cured by heating at 150° C for 15 minutes. The resulting glass cloth having an average thickness of 0.4 mm, as so cured or after further heating at 250° C for 7 days, was cut into pieces, each 0.5 cm wide and 15 cm long. The test piece thus obtained was held vertically with its lower portion directly contacted with the inner flame top of an alcohol lamp for 15 seconds to be ignited, and after the alcohol lamp was moved away, the fire-extinguishing time in seconds recorded to determine the flame retardancy of the test piece.

EXAMPLE 1

Hundred parts of a dimethylpolysiloxane having both chain ends of the molecule blocked with dimethylvinylsilyl groups having a viscosity of 10,000 centistokes measured at 25° C was uniformly mixed with 10 parts of fumed silica powder having a specific surface area of about 200 m$^2$/g, treated with trimethylchlorosilane, 10 parts of powdery zinc carbonate with an average particle diameter of about 5 $\mu$m and 0.5 part of powdery ceric oxide. Then, to the mixture were added 0.0030 part (as metallic platinum) of a 2% solution of chloroplatinic acid in 2-ethylhexanol and 3 parts of a methylhydrogenpolysiloxane having both chain ends of the molecule blocked with trimethylsilyl groups having a viscosity of 20 centistokes measured at 25° C, to obtain an organopolysiloxane composition, in which the ratio of the silicon-bonded hydrogen atoms to the silicon-bonded vinyl groups was about 10 in moles.

When the composition was heated at 150° C for 15 minutes, a rubbery elastomer having hardness of 30, tensile strength of 20 kg/cm² and ultimate elongation of 250% was obtained.

The organopolysiloxane composition was applied by dipping to a glass sleeve having an inner diameter of 1 mm and cured by heating at 150° C for 15 minutes, to obtain a cured silicone-impregnated glass sleeve.

The flame retardancy and breakdown boltage of the glass sleeve as cured or heated at 250° C for 7 days were determined, with the results as shown in Table I.

Table I

| | Flame Retardancy | Breakdown Voltage |
|---|---|---|
| As cured | 5 sec. | 8.2 kV |
| After heating at 250° C for 7 days | 4 sec. | 6.8 kV |

EXAMPLE 2

Hundred parts of a dimethylpolysiloxane having both chain ends of the molecule blocked with dimethylvinylsilyl groups having a viscosity of 5,000 centistokes measured at 25° C was uniformly mixed with 10 parts of trimethylchlorosilane-treated fumed silica powder, 5 parts of basic zinc carbonate powder with an average particle diameter of about 3 μm and 0.2 part of powdery ceric oxide. Then, to the resulting mixture were added 0.0005 part (as metallic platinum) of a 2% solution of chloroplatinic acid in 2-ethylhexanol and 3.5 parts of a methylhydrogenpolysiloxane composed of 12 dimethylsiloxane units, 6 methylhydrogensiloxane units and 2 dimethylhydrogensiloxane units, to obtain an organopolysiloxane composition, in which the ratio of the silicon-bonded hydrogen atoms to the silicon-bonded vinyl groups was about 3.0 in moles.

When the composition was heated at 150° C for 15 minutes, a rubbery elastomer having hardness of 15, tensile strength of 16 kg/cm² and ultimate elongation of 400% was obtained. A glass sleeve having an inner diameter of 1 mm was impregnated and coated with the above organopolysiloxane composition, followed by heat treatment at 150° C for 15 minutes, to obtain a cured silicone-coated glass sleeve.

The flame retardancy and breakdown voltage of the glass sleeve as cured or heated at 250° C for 7 days were determined with the results shown in Table II.

TABLE II

Table II

| | Flame Retardancy | Breakdown Voltage |
|---|---|---|
| As cured | 6 sec. | 7.5 kV |
| After heating at 250° C for 7 days | 4 sec. | 5.5 kV |

EXAMPLE 3

Hundred parts of a methylphenylpolysiloxane composed of 90 mole % of dimethylsiloxane units and 10 mole % of methylphenylsiloxane units having both claim ends of the molecule blocked with dimethylvinylsilyl groups having a viscosity of 400 centistokes measured at 25° C was uniformly mixed with 15 parts of precipitated silica powder having a specific surface area of about 150 m²/g, 15 parts of zinc carbonate powder and 1.0 part of powdery ceric oxide. Then, to the resulting mixture were added 0.0010 part (as metallic platinum) of a 2% solution of chloro-platinic acid in 2-ethylhexanol and 7 parts of an organopolysiloxane composed of equimolar amounts of dimethylhydrogensiloxane units $(CH_3)_2HSiO_{0.5}$ and phenylsiloxane units $C_6H_5SiO_{1.5}$, to obtain an organopolysiloxane composition, in which the molar ratio of the silicon-bonded hydrogen atoms to the silicon-bonded vinyl groups was about 2.0.

When the composition was heated at 150° C for 15 minutes, a rubbery elastomer having hardness of 15, tensile strength of 15 kg/cm² and ultimate elongation of 200% was obtained. A glass sleeve having an inner diameter of 1 mm was impregnated and coated with the composition followed by heat treatment at 150° C for 15 minutes, to obtain a cured silicone-coated glass sleeve.

The flame retardancy and breakdown voltage of the glass sleeve as cured or heated at 250° C for 7 days were determined with the results as shown in Table III.

Table III

| | Flame Retardancy | Breakdown Voltage |
|---|---|---|
| As cured | 10 sec. | 7.2 kV |
| After heating at 250° C for 7 days | 7 sec. | 5.6 kV |

EXAMPLE 4

Hundred parts of a dimethylpolysiloxane having both chain ends of the molecule blocked with dimethylvinylsilyl groups having a viscosity of 10,000 centistokes measured at 25° C was uniformly mixed with 10 parts of trimethylchlorosilane-treated fumed silica powder, 20 parts of zinc carbonate powder and 0.5 part of powdery ceric oxide. Then, to the resulting mixture were added 0.0020 part (as metallic platinum) of a 2% solution of chloro-platinic acid in 2-ethylhexanol and 6 parts of a methylhydrogenpolysiloxane having a viscosity of 20 centistokes measured at 25° C and having both chain ends of the molecule blocked with trimethylsilyl groups, to obtain an organopolysiloxane composition, in which the molar ratio of the silicon-bonded hydrogen atoms to the silicon-bonded vinyl groups was about 20.

When the composition was heat at 150° C for 15 minutes, a rubbery elastomer having hardness of 20, tensile strength of 18 kg/cm² and ultimate elongation of 260% was obtained. A glass sleeve having an inner diameter of 1 mm was impregnated and coated with the composition, followed by heat treatment at 150° C for 30 minutes, to obtain a cured silicone-coated glass sleeve.

The flame retardancy and breakdown voltage of the glass sleeve as cured or heated at 250° C for 7 days were determined with the results as shown in Table IV.

Table IV

| | Flame Retardancy | Breakdown Voltage |
|---|---|---|
| As cured | 7 sec. | 6.8 kV |
| After heating at | | |

Table IV-continued

| | Flame Retardancy | Breakdown Voltage |
|---|---|---|
| 250° C for 7 days | 5 sec. | 5.5 kV |

EXAMPLE 5

Hundred parts of a dimethylpolysiloxane having both chain ends of the molecule blocked with dimethylvinylsilyl groups having a viscosity of 5,000 centistokes measured at 25° C was uniformly mixed with 10 parts of trimethylchlorosilane-treated fumed silica powder, 1 part of basic zinc carbonate powder and 0.5 part of powdery ceric oxide. To the resulting mixture were added 0.0002 part (as metallic platinum) of a 2% solution of chloroplatinic in 2-ethylhexanol and 2 parts of a methylhydrogenpolysiloxane having both chain ends of the molecule blocked with trimethylsilyl groups and having a viscosity of 20 centistokes as measured at 25° C, to obtain an organopolysiloxane composition, in which the molar ratio of the silicon-bonded hydrogen atoms to the silicon-bonded vinyl groups was about 5.0.

When the composition was heated at 150° C for 15 minutes, a rubbery elastomer having hardness of 35, tensile strength of 14 kg/cm$^2$ and ultimate elongation of 240% was obtained. A glass sleeve having an inner diameter of 1 mm was inpregnated and coated with the composition, followed by heat-treatment at 150° C for 15 minutes, to obtain a cured silicon-coated glass sleeve.

The flame retardancy and breakdown voltage of the glass sleeve as cured or heated at 250° C for 7 days were determined with the results as shown in Table V.

Table V

| | Flame Retardancy | Breakdown Voltage |
|---|---|---|
| As cured | 6 sec. | 8.0 kV |
| After heating at 250° C for 7 days | 4 sec. | 7.1 kV |

EXAMPLE 6

To a mixture consisting of 95 parts of a dimethylpolysiloxane having both chain ends of the molecule blocked with dimethylvinylsilyl groups having a viscosity of 10,000 centistokes measured at 25° C and 5 parts of an organopolysiloxane composed of $(CH_3)_3SiO_{0.5}$ units, $(CH_2=CH)(CH_3)_2SiO_{0.5}$ units and $SiO_2$ units in a molar ratio of 1:0.15:1 were added 10 parts of fumed silica powder, 10 parts of powdery zinc carbonate and 1.0 part of powdery ceric oxide. Then, to the resulting mixture were added 0.0010 part (as metallic platinum) of a 2% solution of chloro-platinic acid in 2-ethylhexanol and 2 parts of a methylhydrogenpolysiloxane composed of $(CH_3)_3SiO_{0.5}$ units, $(CH_3)_2(H)SiO_{0.5}$ units and $SiO_2$ units in a molar ratio of 0.1:2.0:1.0, to obtain an organopolysiloxane composition, in which the molar ratio of the silicon-bonded hydrogen atoms to the silicon-bonded vinyl groups was about 5.0.

When the composition was heated at 150° C for 15 minutes, a rubbery elastomer having hardness of 35, tensile strength of 30 kg/cm$^2$ and ultimate elongation of 300% was obtained. A glass cloth was impregnated by dipping with the composition, followed by heat treatment at 150° C for 15 minutes to obtain a cured silicone-treated glass cloth.

The flame retardancy and breakdown voltage of the glass cloth as cured or heated at 250° C for 7 days were determined with the results as shown in Table VI.

Table VI

| | Flame Retardancy | Breakdown Voltage |
|---|---|---|
| As cured | 5 sec. | 7.5 kV |
| After heating at 250° for 7 days | 4 sec. | 6.0 kV |

EXAMPLE 7

To a mixture consisting of 90 parts of a dimethylpolysiloxane having both chain ends of the molecule blocked with dimethylvinylsilyl groups having a viscosity of 5,000 centistokes measured at 25° C and 10 parts of an organopolysiloxane composed of $(CH_3)_3SiO_{0.5}$ units, $(CH_2=CH)(CH_3)_2SiO_{0.5}$ units and $SiO_2$ units in a molar ratio of 1.0:0.15:1.0 were added 20 parts of fumed silica powder, 10 parts of powdery zinc carbonate and 1.0 part of powdery ceric oxide. Then, to the resulting mixture were added 0.0010 part (as metallic platinum) of a 2% solution of chloro-platinic acid in 2-ethylhexanol and 2 parts of the same methylhydrogenpolysiloxane as employed in Example 6, to obtain an organopolysiloxane composition, in which the molar ratio of the silicon-bonded hydrogen atoms to the silicon-bonded vinyl groups was about 1.5.

When the composition was heated at 150° C for 15 minutes, a rubbery elastomer having hardness of 40, tensile strength of 40 kg/cm$^2$ and ultimate elongation of 350% was obtained. A glass cloth was impregnated by dipping with the composition, followed by heat treatment at 150° C for 15 minutes to obtain a cured silicone-treated glass cloth.

The flame retardancy and breakdown voltage of the glass cloth as cured or heated at 250° C for 7 days were determined with the results as shown in Table VII.

Table VII

| | Flame Retardancy | Breakdown Voltage |
|---|---|---|
| As cured | 6 sec. | 7.0 kV |
| After heating at 250° C for 7 days | 4 sec. | 5.5 kV |

EXAMPLE 8

An asbestos cloth was dipped in the organopolysiloxane composition prepared in Example 1 and squeezed to a resin pick-up of about 30%, followed by curing at 150° C for 30 minutes. The asbestos cloth thus impregnated was subjected to use as a fireproof curtain in electric-welding work for the purpose of protecting workers from sparks and, as a result, found to have a sufficiently long service life without being damaged or ignited by the sparks.

EXAMPLE 9

For purposes of comparison, two organopolysiloxane compositions were prepared in the same procedure as in Example 1 excepting the omission of zinc carbonate or ceric oxide, the resulting composition being called composition (a) or (b), respectively.

A third composition (c) was prepared in the same procedure as in Example 1 except that 0.3 part, instead of 3 parts, of the methylhydrogen-polysiloxane was employed.

Each composition thus obtained was used to impregnate a glass sleeve in the same manner as in Example 1, and the so treated glass sleeves were determined for flame retardancy and breakdown voltage. The results are set out in Table VIII.

Table VIII

| Compo- | Flame Retardancy, sec. | | Breakdown Voltage, kV | |
| --- | --- | --- | --- | --- |
| sition | As cured | After heating | As cured | After heating |
| (a) | >60 | >60 | 5.0 | 5.6 |
| (b) | 5 | 6 | 7.8 | 2.5 |
| (c) | >60 | >60 | 7.0 | 6.5 |

What is claimed is:

1. An organopolysiloxane composition comprising
A. 100 parts by weight of a mixture consisting of
   a. an organopolysiloxane having at least two vinyl groups directly bonded to the silicon atoms in a molecule and
   b. an organohydrogenpolysiloxane having at least three hydrogen atoms directly bonded to the silicon atoms, the amount of the organohydrogenpolysiloxane being sufficient to provide at least one and a half hydrogen atoms directly bonded to the silicon atoms per vinyl group of organopolysiloxane (a),
B. from 5 to 50 parts by weight of a silica filler,
C. from 0.5 to 40 parts by weight of zinc carbonate,
D. from 0.05 to 10 parts by weight of ceric oxide, and
E. a catalytic amount of platinum or a platinum compound.

2. The organopolysiloxane composition as claimed in claim 1 wherein component (a) has a viscosity of from 200 to 100,000 centistokes as measured at 25° C.

3. The organopolysiloxane composition as claimed in claim 1 wherein component (a) is a dimethylpolysiloxane terminated at both molecular chain ends with dimethylvinylsilyl groups.

4. The organopolysiloxane composition as claimed in claim 1 wherein component (B) is contained in an amount of from 10 to 30 parts by weight per 100 parts by weight of component (A).

5. The organopolysiloxane composition as claimed in claim 1 wherein component (B) has a specific surface area of from 100 to 400 m²/g.

6. The organopolysiloxane composition as claimed in claim 1 wherein component (C) is contained in an amount of from 2 to 20 parts by weight per 100 parts by weight of component (A).

7. The organopolysiloxane composition as claimed in claim 1 wherein component (C) has an average particle diameter of not larger than 10 μm.

8. The organopolysiloxane composition as claimed in claim 1 wherein component (D) is contained in an amount of from 0.2 to 2.0 parts by weight per 100 parts by weight of component (A).

9. A flame retardant material comprising an inorganic fabric material impregnated with the cured organopolysiloxane composition of claim 1.

10. The flame retardant material as claimed in claim 9 wherein said inorganic fabric material is a glass fiber article.

11. The flame retardant material as claimed in claim 9 wherein said inorganic fabric material is an asbestos cloth.

12. The flame retardant material as claimed in claim 10 wherein said glass fiber article is a glass sleeve.

13. The flame retardant material as claimed in claim 10 wherein said glass fiber article is a glass cloth.

14. An organopolysiloxane composition comprising
A. 100 parts by weight of a mixture consisting of
   a. a dimethylpolysiloxane terminated at both molecular chain ends with dimethylvinylsilyl groups having a viscosity in the range between 200 and 100,000 centistokes at 25° C, and
   b. an organohydrogenpolysiloxane containing in a molecule at least three hydrogen atoms directly bonded to the silicon atoms in an amount sufficient to provide 1.5 to 30 hydrogen atoms directly bonded to the silicon atoms per vinyl group of dimethylpolysiloxane (a),
B. 10 to 30 parts by weight of a silica filler with a specific surface area of from 100 to 400 m²/g,
C. 2 to 20 parts by weight of zinc carbonate having an average particle diameter of not larger than 10 μm,
D. 0.2 to 2.0 parts by weight of ceric oxide, and
E. a catalytic amount of a platinum compound.

* * * * *